Oct. 5, 1971                     W. J. LADO                      3,609,974
            TELESCOPIC BOOM WITH MOVEMENT PROPORTIONED
                        BY CYLINDERS IN SERIES
Filed June 5, 1969                                       2 Sheets-Sheet 1
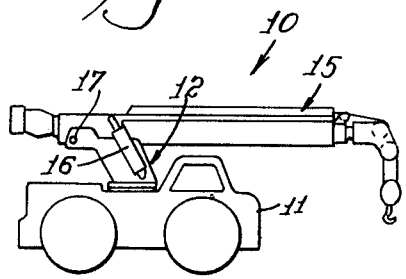
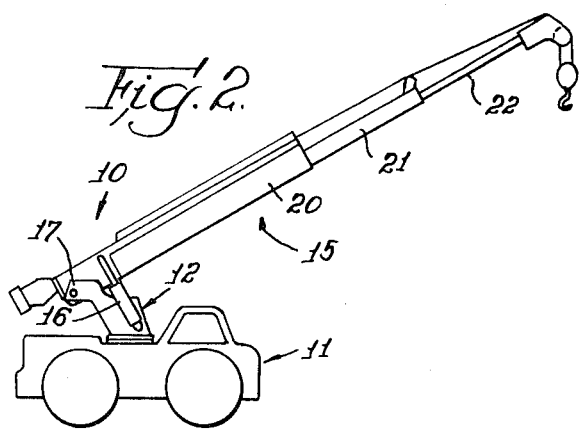
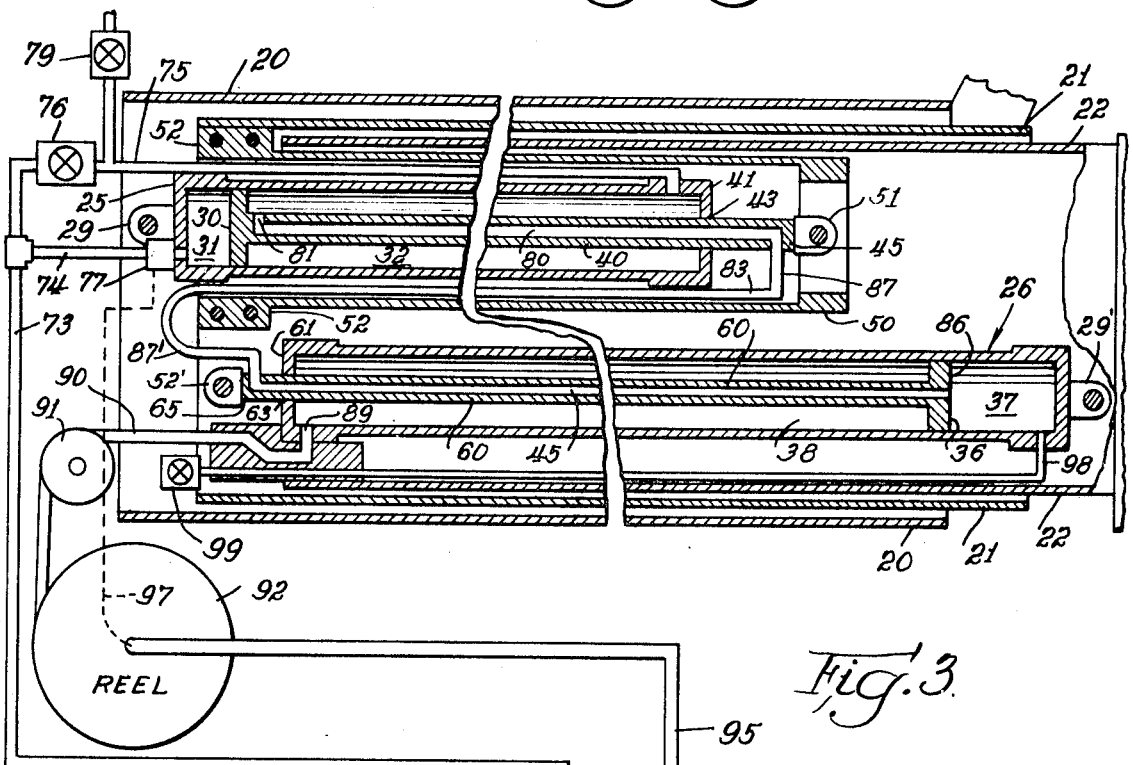
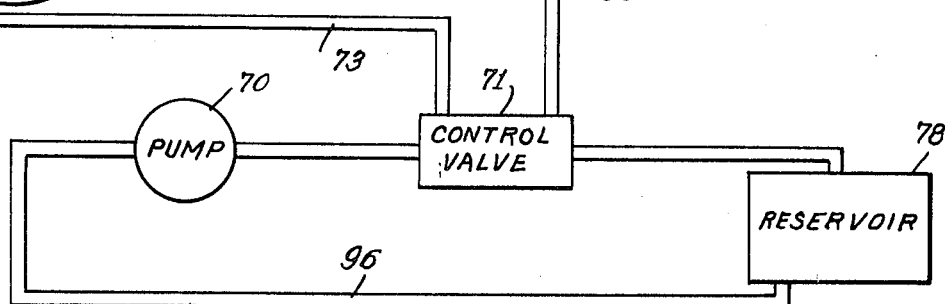
Inventor
William J. Lado
By
Dorbo, Robertson & Vandenbergh
Att'ys.

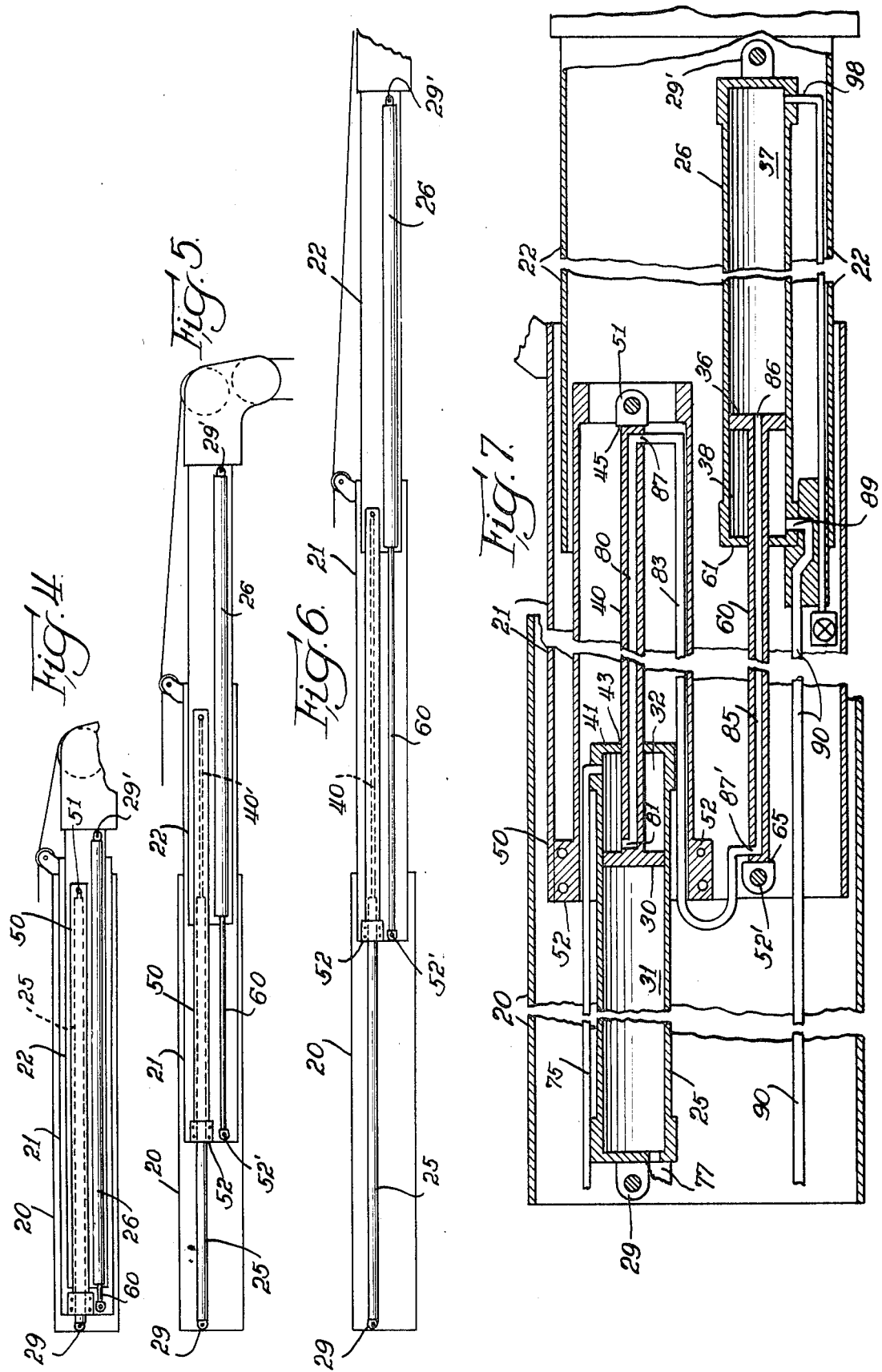

United States Patent Office 3,609,974
Patented Oct. 5, 1971

3,609,974
**TELESCOPIC BOOM WITH MOVEMENT PROPOR-
TIONED BY CYLINDERS IN SERIES**
William J. Lado, Rome, N.Y., assignor to
Pettibone Corporation, Chicago, Ill.
Filed June 5, 1969, Ser. No. 830,673
Int. Cl. F01b *1/00;* F15b *7/00*
U.S. Cl. 60—54.5
4 Claims

ABSTRACT OF THE DISCLOSURE

In a telescopic boom of three or more sections, the stages of telescopic action are made to keep pace with one another by powering the telescopic movements by cylinders which are connected in series so that the discharge from one powers the next. With a preferred three-section system, using two cylinders, both piston rods are connected to the intermediate section, the rearmost of the two telescoping sections, and the hydraulic connection between the cylinders is made via the piston rods. Hence, the cylinders are hydraulically connected together by a fixed length conduit. A single hose reel is sufficient, the reeled hose extending to the most forward moving cylinder. The boom section controlled by this cylinder telescopes rearwardly within the other sections, but around both of the cylinders, the piston of the non-advancing cylinder being connected to the boom part which it advances by a sleeve or frame which telescopes about the cylinder. A smaller diameter of cylinder is used for each succeeding advancing cylinder to equalize the telescopic movements. Lines for charging and bleeding extend to the forward ends of the cylinders and are provided with accessible manual gate valves.

BACKGROUND OF THE INVENTION

The present invention relates to cranes with hydraulically extended booms having at least three parts or sections, at least two of which telescope within the main section.

In cranes heretofore available with a plurality of crowd cylinders, it has been generally thought necessary to utilize a hose reel to wind two or more hoses. The use of dual hose reels has proven to be relatively unsatisfactory. The provision of two reels is expensive and often presents a problem in finding suitable space. One problem which can be encountered results from the piling-up of one hose along the flange of the hose reel while another hose winds level. This occurrence makes the hose which level winds become slack and occasionally, slack enough to be cut or damaged by the boom when retracting. It is highly desirable to provide cranes with hydraulically extended booms which utilize a single hose reel. It is also highly desirable to provide telescoping booms with a plurality of cylinders having fixed, fixed length hoses therebetween.

It has been heretofore suggested that multi-section booms be controlled to require the stronger of the extendible sections to completely extend before the next-weakest section begins its extension. This kind of operation is generally known as sequential extension, and necessarily involves operating characteristics which some engineers prefer to avoid. For example, complete extension of the one section of the boom before any extension movement by any of the other boom sections necessarily means maximized wear on the components supporting the fully extended section of the boom. This section is operating at all times, even though the other sections may less frequently, and perhaps even rarely, be extended. When it is nearly fully extended the bearing pads or the like are subjected to very high forces. Thus a fully extended boom section not only generates force vectors which tend to depress the boom, but moreover acts as a lever arm which, inserted into a tube, tends to split or bend the tube. Extension and retraction under the latter-mentioned extreme forces necessarily involves a degree of friction and wear problems not encountered under conditions of lesser extension. It is considered desirable by some engineers to equalize and evenly distribute the movement between crowd cylinders rather than have these conditions which lead to maximum wear. It is also considered highly desirable to equalize and minimize the effects of flexing forces (which exert great leverage on fully extended cylinders and rods). Both wear and flexing are reduced by extending each boom segment simultaneously to an approximately equal extent. The simultaneous extension of boom segments can equalize flexing forces when each boom section is extended equally. Wear is thus minimized since each boom is extended a minimal amount per extent of overall boom extension. Thus, it is an object of this invention to provide a multi-sectioned boom which utilizes a single hose reel, and which provides for automatic simultaneous extension of all crowd cylinders to minimize and evenly distribute wear between components of the plurality of cylinders. It is also an object of this invention to provide a crane having a boom with three or more hydraulically extended sections in which the effect of flexing forces is minimized and equalized between each of the boom sections.

SUMMARY OF THE INVENTION

In accordance with this invention crowd cylinders for extending a boom with a series of telescoping sections are hydraulically connected in series. Two cylinders adjacent in the series are fixed with respect to a first and third section. Ends of the adjacent cylinders are fixed to the intermediate section. The cylinders are hydraulically rigged so that displacement can occur in chambers on each side of the piston, and the fluid enclosed behind the piston (in a "rod-chamber") of the first cylinder is hydraulically connected to the fluid at the face of the piston, i.e., in the "face chamber" in the second cylinder. The hydraulic "circuit" includes conduits within the piston rods to one or the other of the chambers. In a two-cylinder embodiment the fluid behind the piston of the second cylinder is hydraulically connected by way of a reel to the hydraulic external control circuit. In a three cylinder embodiment the fluid in the rod chamber of the second cylinder is hydraulically connected to the face chamber of the third piston through a part of the third cylinder (possibly the rod) which is attached to the third cylinder. The first piston is fixed with respect to the non-extending boom section, and the hydraulic lines leading to the first cylinder need not be extendible and can be attached to the non-extending boom section. Only the hydraulic lines leading from the far end of the last cylinder need be equipped with a take-up device such as a reel. In accordance with this invention, therefore, each boom section is extended simultaneously. In accordance with the preferred embodiments of this invention, each boom section is extended equally. The hydraulic series could also start at the farthest section and end at the non-extended section, in which case the lead line would be reeled, and final discharge line would be fixed length.

DESIGNATION OF THE FIGURES OF THE DRAWINGS

FIG. 1 shows a mobile crane with the boom lowered and completely retracted.

FIG. 2 illustrates the crane of FIG. 1 with the boom in elevated extended position.

FIG. 3 is a schematic cross-section view illustrating the manner in which the crowd cylinders are attached in series, and a preferred arrangement for attaching the various crowd cylinder components to the respective boom sections.

FIG. 4 shows the relative disposition of parts when the boom is fully retracted.

FIG. 5 shows the relative disposition of parts when the boom is partially extended.

FIG. 6 illustrates the condition of parts when the boom is fully extended.

FIG. 7 is similar to FIG. 3 except that it provides an enlarged fragmented detailed schematic cross-sectional view of the condition of parts when the boom is fully extended.

DESCRIPTION OF PREFERRED EMBODIMENTS

Although the following disclosure offered for public dissemination, in return for the grant of a patent, is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Cranes, generally 10, which are improved in accordance with this invention can be mounted, for example, on vehicle 11, and are supported by a support structure, generally 12, which is usually rotatable around a vertical axis. Crane, generally 10, includes hydraulically extendible boom 15 which can be elevated by hydraulic cylinder means 16, in which case boom, generally 15, pivots upwardly around axle 17.

In the illustrated embodiment, boom, generally 15, includes three sections, namely, a first section 20, a second section 21, and a terminal section 22. Also, in the illustrated embodiment a pair of crowd cylinders are employed, namely, a first cylinder 25 the hydraulic series and second cylinder 26. First cylinder 25 and second cylinder 26 are fixed by suitable fastening means 29, 29' to first section 20, and terminal section 22, respectively. Piston 30, divides the interior of cylinder 25 into two separate compartments or chambers, namely, face chamber 31 and rear chamber 32. Likewise, piston 36 divides the interior of cylinder 26 into two compartments or chambers, namely, face chamber 37 and rear chamber 38. Piston rod 40, is attached to piston 30 and passes through rear end 41 of cylinder 25 by way of hydraulically sealed opening 43. Rod 40, is fixed at its exterior end 45, to sleeve 50 by suitable fastening means 51. Sleeve 50 is fixed by suitable fastening means 52 to middle section 21.

Rod 60 is fixed to piston 36 and slidably passes through the rear wall 61 of cylinder 36 through hydraulically sealed opening 63. Exterior end 65, rod 60, is attached by suitable fastening means 52' to middle section 21.

HYDRAULIC SYSTEM

As seen in FIG. 3, the crane's hydraulic system includes pump 70, operating control valve 71, fixed length hydraulic hose 73, and fixed length conduit 74 connecting line 73 to face chamber 31 of cylinder 25 through pilot actuated check valve 7, which, unless released, prevents flow out of face chamber 31. Bleed line 75 connects rear chamber 32 of line 73 by way of valve 76 and to atmosphere or to reservoir 78 by way of bleed valve 79 (connections not shown since they constitute no part of the invention). It is to be understood that valves 76 and 79 are normally closed in the operation of the improvement of the invention.

Rear chamber 32 of first cylinder 25 is hydraulically connected to face chamber 37 of second cylinder 26. In the schematically illustrated embodiments this hydraulic connection is made by way of conduit 80 which passes substantially through the entire center of rod 40, draining chamber 32 through opening 81 near piston 30. Conduit 80 is hydraulically connected to hose 83, then to conduit 85 which in turn, passes through the center of the entire length of rod 60, discharging through mouth 86 into face chamber 37 of cylinder 26. Hence both external ends 45, and 65 of rods 40 and 60, respectively, have an orifice 87, 87', respectively, through which chamber fluid can pass. Rear chamber 38 of second cylinder 26 is hydraulically connected to hose 90 which passes by way of pulley 91 to single hose reel 92. Reel 92 is maintained under constant tension by suitable spring means (not shown, since conventional) so that all slack in hose 90 is constantly taken up. The hose 90 on reel 92 is connected by way of return line 95 through control valve 71 to reservoir 78. Needless to say, the hydraulic system includes other hydraulic components such as pump feed line 96 which are needed to complete the system as well known in the art. Pilot line 97 connects line 95 to pilot check valve 77 to release check valve 77. Also, cylinder 26 is fitted with bleed line 98 and manually available bleed valve 99. Bleed lines preferably vent the top of a chamber to facilitate air removal.

OPERATION OF CROWD CYLINDERS

When the entire hydraulic system is full of hydraulic fluid and when pump 70 is operating, manipulation of control valve 71 into boom extending position pressurizes high pressure line 73 urging hydraulic fluid into face chamber 31. Displacement of face chamber 31 forces piston 30 rearwardly, and this displacement simultaneously has two immediate effects. A first immediate effect is the urging of sleeve 50 away from cylinder mounting 29 thus extending boom section 21 out of shipper section 20. The second immediate effect is the compression of fluid within rear chamber 32 forcing fluid through orifice 81, conduit 80, orifice 87, hose 83, orifice 87', conduit 85, and orifice 86, into face chamber 37. As fluid is forced into face chamber 37, chamber 37 is urged to expand and this also has two immediate effects. First of all, expansion of the volume of face chamber 37 cannot be accomplished by movement of rod 60 against mounting 52'. Thus, cylinder 26, instead, moves against mounting 29' thus urging terminal boom section 22 to extend. However, passage of cylinder 26 over piston 36, as face chamber 37 expands, tends to compress fluid in rear chamber 38 of cylinder 26 and this, in turn, forces fluid from chamber 38 through chamber orifice 89 through hoses 90 and 95 to return to reservoir 78.

It will be appreciated that reverse flow of fluid in the hydraulic system provides powered retraction of bloom sections. Thus, upon manipulation of control valve 71 to retraction position, fluid from line 96 which is pressurized by pump 70 is forced through line 95 to pressurize line 97 sufficiently to release pilot check valve 77. Pressurized fluid in line 95 also passes by way of reel 92 and pulley 91 through hose 90 into rear chamber 38 of cylinder 26. This forces expansion of chamber 38 which can only be accomplished by movement of cylinder 26 and attachment means 29' in a retraction direction toward attachment means 52'. Such movements, of course, tend to compress fluid in face chamber 37. Thus, as pressure increases in face chamber 37 fluid is forced out of face chamber 37 through conduit 85, hose 83, and conduit 80 through mouth 81 into rear chamber 32 of cylinder 25. Expansion of chamber 32 of cylinder 25 can only be accomplished by movement of rod 40 into cylinder 25, drawing attachment means 51 (and sleeve 50 and section 21) closer to attachment means 29. As expansion of rear chamber 32 of cylinder 25 continues, fluid in face chamber 31 is forced through check valve 77, line 74, 73, to control valve 71. As indicated above, check valve mechanism 77 is released by a threshold, or pilot, pressure generated by the boom retraction control mechanism. Positioning of check valve 77 at cylinder 25 is conventional, and prevents unwanted retraction of the boom due to force of gravity or in the event line 73 is damaged.

The unique arrangement of cylinders in accordance with this invention nonetheless does provide positive, power retraction of the boom which is particularly valuable when the boom is being utilized at relatively low angles. Thus, in accordance with this invention the boom has a power retraction as well as power-extension characteristic.

DESIGN PRINCIPLES

In designing a particular embodiment in accordance with this invention, the designer has at his disposal a great degree of flexibility regarding the distance each boom section is extended. It will be clear to those skilled in the art of designing hydraulic systems that the area of the face of a piston is greater than the area of the "back" of that piston, if a portion of the rear of a piston is blocked by a piston rod. Thus, though the force exerted against both sides of a piston may be at equilibrium, for example, the fluid pressure in the rod chamber must be higher than in the face chamber, because the rod-chamber side of the piston has less effective piston area. Also, the cross-sectional area (available for fluid) of the rod-chamber will always be less than the cross-sectional area of the face chamber, due to the pressure of the rod in the rod-chamber.

Therefore, if equal extension of successive booms is desired, the face area of a second piston must equal the rod-chamber-side of a preceding piston. (That is, the face chamber cross-sectional area equals the cross-sectional area of the rod-chamber of the preceding cylinder.) Hence, successively smaller cylinders are required.

However, if it is desired that a boom be designed to have longer sections near a base, and shorter sections at distant end of the boom, and if it is desired that the extension or retraction of each section be proportional to the overall length of that section, it is only necessary that the fluid-available cross-sections of succeeding chambers in succeeding cylinders be so proportioned. For example, if the length of succeeding boom sections are three and two units, respectively, full extension of each section will occur in proportion to length of each boom, by utilizing a cylinder between them which has a piston face-chamber area 1.5 times that of the fluid-available cross-sectional area of the rod-chamber of the preceding cylinder.

In order to take fullest advantage of this invention, it is essential that a conduit be utilized in the rod of the first cylinder means in the series, and in any and all intermediate cylinder means. But it is not always essential that the rod be utilized as a conduit in the last cylinder means of a series of cylinder means, if the rod of the last cylinder means in the series is attached to a terminal, extendible boom section. Hence, for example, in a three-section telescoping boom, two sections of which are extendible, and in which the second cylinder assembly is fixed to the intermediate boom section and the rod assembly of the second cylinder means is fixed to the terminal section of the boom, the rod chamber of the second cylinder assembly, which moves with the intermediate boom can be hydraulically connected to the extendible return circuit hose directly through the end of wall of the second cylinder.

As used herein, the sequence or counting order of a series of cylinder means is defined or determined by the direction of flow of hydraulic fluid when the boom is *extending*.

ACHIEVEMENT

In accordance with this invention, therefore, applicant has provided the art with a novel arrangement of cylinders in a multi-sectioned boom by which simultaneous and equalized extension of the sections can be assured. This is considered highly desirable, by some, inasmuch as wear and strain is reduced and is equalized between sections. The extreme forces encountered when one section works while nearly fully extended are rarely encountered. Also, the simultaneous and equalized extension of each of the boom sections provides uniform distribution of flexing forces on all sections. This is considered to be of great importance and minimizing wear and fatigue. Also, the hydraulic lines between cylinders are relatively fixed and of fixed length, and are thus adaptable to relatively fixed support, so that they are not apt to be damaged by inadvertent contact with moving sections. Moreover, inasmuch as only one variable length (reeled) hose is required for a series of cylinders, the difficulties inherent in multi-hose reels are not encountered with this invention.

Therefore I claim:

1. A boom including base, intermediate and forward sections, the latter two telescoping as to each other and the base section, and a plurality of cylinder-piston combinations, one coupled at one end to each of the latter sections and at its other end to the section with which it telescopes for actuating a telescopic action therebetween, said cylinder-piston combinations being connected hydraulically in series with the fluid forced out of one cylinder by flow of pressure fluid into it serving as the pressure fluid for the other cylinder so that by supplying hydraulic fluid under pressure to the series in one direction both cylinder-piston combinations will be expanded to provide mutually paced telescopic actions of their respective sections to extend the boom, and supplying hydraulic fluid under pressure to the series in the opposite direction will contract the cylinder-piston combinations to provide mutually paced telescopic retraction of their respective sections.

2. A boom including base, intermediate and forward sections, the latter two telescoping as to each other and the base section, and a plurality of cylinder-piston combinations, one coupled at one end to each of the latter sections and at its other end to the section with which it telescopes for actuating a telescopic action therebetween, said cylinder-piston combinations being connected hydraulically in series with the fluid forced out of one cylinder by flow of pressure fluid into it serving as the pressure fluid for the other cylinder so that by supplying hydraulic fluid under pressure to the series in one direction both cylinder-piston combinations will be expanded to provide mutually paced telescopic actions of their respective sections to extend the boom, and supplying hydraulic fluid under pressure to the series in the opposite direction will contract the cylinder-piston combinations to provide mutually paced telescopic retraction of their respective sections;

further characterized in that the intermediate and forward sections are, as compared to the base section, of successively reduced transverse dimensions and strength.

3. A boom including base, intermediate and forward sections, the latter two telescoping as to each other and the base section, and a plurality of cylinder-piston combinations, one coupled at one end to each of the latter sections and at its other end to the section with which it telescopes for actuating a telescopic action therebetween, said cylinder-piston combinations being connected hydraulically in series with the fluid forced out of one cylinder by flow of pressure fluid into it serving as the pressure fluid for the other cylinder so that by supplying hydraulic fluid under pressure to the series in one direction both cylinder-piston combinations will be expanded to provide mutually paced telescopic actions of their respective sections to extend the boom, and supplying hydraulic fluid under pressure to the series in the opposite direction will contract the cylinder-piston combinations to provide mutually paced telescopic retraction of their respective sections;

further characterized in that the intermediate and forward sections are, as compared to the base section, of successively reduced transverse dimensions and strength; and further characterized in that of the two hydraulic connections for supply of pressure fluid to and return of fluid from the series-connected cylinder-piston combinations, one is of non extensible nature connected to a cylinder at a point substantially fixed in the base section and leading to its chamber on the face side of its piston, and the other includes a reel-wound hose leading to the rod side of the other piston, the hydraulic connection between the cylinders being through at least one piston rod and a conduit substantially fixed in the intermediate section.

4. A boom including base, intermediate and forward sections, the latter two telescoping as to each other and the base section, and a plurality of cylinder-piston combinations, one coupled at one end to each of the latter sections and at its other end to the section with which it telescopes for actuating a telescopic action therebetween, said cylinder-piston combinations being connected hydraulically in series with the fluid forced out of one cylinder by flow of pressure fluid into it serving as the pressure fluid for the other cylinder so that by supplying hydraulic fluid under pressure to the series in one direction both cylinder-piston combinations will be expanded to provide mutually paced telescopic actions of their respective sections to extend the boom, and supplying hydraulic fluid under pressure to the series in the opposite direction will contract the cylinder-piston combinations to provide mutually paced telescopic retraction of their respective sections;

further characterized in that the intermediate and forward sections are, as compared to the base section, of successively reduced transverse dimensions and strength; and further characterized in that of the two hydraulic connections for supply of pressure fluid to and return of fluid from the series-connected cylinder-piston combinations, one is of non extensible nature connected to a cylinder at a point substantially fixed in the base section and leading to its chamber on the face side of its piston, and the other includes a reel-wound hose connected through the rear end of the other cylinder and leading to the rod side of the other piston, the hydraulic connection between the cylinders being through at least one piston rod and a conduit substantially fixed in the intermediate section.

References Cited
UNITED STATES PATENTS

| | | | |
|---|---|---|---|
| 3,212,604 | 10/1965 | Garnett | 92—110 X |
| 3,240,008 | 3/1966 | McMullen | 60—10.5 |
| 3,245,623 | 4/1966 | Herman | 214—7 |
| 3,264,950 | 8/1966 | Knight | 92—61 X |

MARTIN P. SCHWADRON, Primary Examiner

A. M. OSTRAGER, Assistant Examiner

U.S. Cl. X.R.

60—10.5; 91—412; 92—110, 146, 163